United States Patent
Ding et al.

(10) Patent No.: US 6,615,202 B1
(45) Date of Patent: Sep. 2, 2003

(54) METHOD FOR SPECIFYING A DATABASE IMPORT/EXPORT OPERATION THROUGH A GRAPHICAL USER INTERFACE

(75) Inventors: Yuemin Ding, Armonk, NY (US); Marc J. Pannone, Stamford, CT (US); Albert Michael Selvin, Pawling, NY (US); Robert F. Shapiro, White Plains, NY (US); Ying Sun, Stamford, CT (US)

(73) Assignee: Telesector Resources Group, Inc., New York, NY (US)

( * ) Notice: Subject to any disclaimer, the term of this patent is extended or adjusted under 35 U.S.C. 154(b) by 0 days.

(21) Appl. No.: 09/453,360

(22) Filed: Dec. 1, 1999

(Under 37 CFR 1.47)

(51) Int. Cl.[7] .................................. G06F 17/30
(52) U.S. Cl. .................................. 707/3; 345/968
(58) Field of Search .......................... 345/968; 707/4, 707/3, 503, 509, 520, 521, 102

(56) References Cited

U.S. PATENT DOCUMENTS

| | | | |
|---|---|---|---|
| 5,426,781 A | * 6/1995 | Kaplan et al. | 707/4 |
| 5,713,020 A | * 1/1998 | Reiter et al. | 707/102 |
| 5,819,293 A | 10/1998 | Comer et al. | 707/203 |
| 6,317,750 B1 | * 11/2001 | Tortolani et al. | 707/103 |

OTHER PUBLICATIONS

Mastering Microsoft Office 97 Professional Edition. Second Edition. Lonnie E. Moseley and David M. Bodey. Sybex: 1997. pp.: 412, 413, and 485–487.*

* cited by examiner

Primary Examiner—Raymond J. Bayerl
Assistant Examiner—Brian Detwiler
(74) Attorney, Agent, or Firm—Leonard C. Suchyta; Loren C. Swingle; John Yankovich (57) ABSTRACT

There is provided a method for specifying an operation via a graphical interface. The method comprises the steps of examining an image to distinguish a first bordered region within the image; examining the image to distinguish a second bordered region within the image; and determining a functional attribute of the second bordered region based on a position of the second bordered region relative to the first bordered region. There is also provided a system for specifying the operation via a graphical interface.

20 Claims, 10 Drawing Sheets

Template From Template Creator

| Title | | | |
|---|---|---|---|
| Table Descriptor | Item Header$_1$ | Item Header$_2$ | Data Header |
| Data Key | Item Descriptor$_1$ | Item Descriptor$_2$ | Data |

Fig. 1

Table Created By End-User (Before Query Of Database)

| Projected Bat And Glove Sales | | | | | |
|---|---|---|---|---|---|
| A : 1, 3 | Product Line | Data Category | 1999 | 2000 | 2001 |
| : PS : IX : 3, 1<br>: Gloves23 : Y : T | Gloves | Current Sales Forecast | | | |
| : PG : P 3, 1<br>: Gloves23 : Y : G | | Projected Sales Gain | | | |
| : PI : IX : 3, 1<br>: Gloves23 : Y : T | | Planned Inventory | | | |
| : DU : IP : 3, 1<br>: Bats72 : Y : T | Bats | Discounted Units | | | |
| : PI : IX : 3,1<br>: Bats72 : Y : T | | Planned Inventory | | | |
| : PS : P : 3, 1<br>: Bats72Y : T | | Projected Sales | | | |

Fig. 2

Table Created By End-User (After Query Of Database)

| Projected Bat And Glove Sales | | | | | | |
|---|---|---|---|---|---|---|
| A : 1, 3 | Product Line | Data Category | 1999 | 2000 | 2001 | |
| : PS : IX : 3, 1<br>: Gloves23 : Y : T | Gloves | Current Sales Forecast | 1050 | 1080 | 1130 | ←38a |
| : PG : P 3, 1<br>: Gloves23 : Y : G | | Projected Sales Gain | 25 | 30 | 50 | ←38b |
| : PI : IX : 3, 1<br>: Gloves23 : Y : T | | Planned Inventory | 225 | 230 | 235 | ←38c |
| : DU : IP : 3, 1<br>: Bats72 : Y : T | Bats | Discounted Units | 27 | 30 | 34 | ←38d |
| : PI : IX : 3,1<br>: Bats72 : Y : T | | Planned Inventory | 99 | 106 | 114 | ←38e |
| : PS : P : 3, 1<br>: Bats72Y : T | | Projected Sales | 720 | 740 | 770 | ←38f |

Fig. 3

Table Edited By End-User For Export To Database

| Projected Bat And Glove Sales | | | | | |
|---|---|---|---|---|---|
| A : 1, 3 | Product Line | Data Category | 1999 | 2000 | 2001 |
| : PS : IX : 3, 1<br>: Gloves23 : Y : T | Gloves | Current Sales Forecast | 1125 | 1155 | 1200 |
| : PG : P 3, 1<br>: Gloves23 : Y : G | | Projected Sales Gain | 25 | 30 | 50 |
| : PI : IX : 3, 1<br>: Gloves23 : Y : T | | Planned Inventory | 225 | 230 | 235 |
| : DU : IP : 3, 1<br>: Bats72 : Y : T | Bats | Discounted Units | 27 | 30 | 34 |
| : PI : IX : 3,1<br>: Bats72 : Y : T | | Planned Inventory | 99 | 106 | 114 |
| : PS : P : 3, 1<br>: Bats72Y : T | | Projected Sales | 720 | 740 | 770 |
| : PS :X : 3, 1<br>: Gloves23 : Y : T | Gloves | Disounted Units | 55 | 70 | 90 |

Rightmost annotations: 38a (first data row), 38g (last data row). Left annotation: 32g (last row). Column annotations: 34c (Product Line), 36g (Data Category).

METHOD FOR SPECIFYING A DATABASE IMPORT/EXPORT OPERATION THROUGH A GRAPHICAL USER INTERFACE

BACKGROUND OF THE INVENTION

1. Field of the Invention

The present invention relates to database systems, and more particularly, to a technique of specifying a database operation via a graphical user interface.

2. Description of the Prior Art

A database is an organized collection of data that can be readily searched, sorted and updated. The database is often logically arranged as tables identified by table names, with columns identified by column names. Access to the database is typically managed by a software interface known as a database management system (DBMS). A processor requiring access to the database issues a command to the DBMS. In accordance with the command, the DBMS modifies the database or returns a result to the processor.

Structured query language (SQL) is a standard protocol for accessing databases. SQL can be used to formulate a database interface statement for subsequently executing a database transaction. SQL includes features that allow users to query, update, insert data into, and delete data from, a database. Commands to a DBMS are made in the form of an SQL transaction.

Many users that require access to information from a database are not familiar with SQL. Some commercial software applications, for example most spreadsheet packages, include mechanisms to retrieve data from a data source. However, these mechanisms are typically static in nature, as they require formulation of fixed queries, placement of data in fixed spreadsheet locations and fixed formatting of data. Even then, complex database queries usually require a user to formulate the query in a pseudo-programming instruction, or through an alteration of software code.

SUMMARY OF THE INVENTION

It is an object of the present invention to provide a method that allows a user of a computer system to specify a data import-or export operation without requiring the user's knowledge of, or manipulation of, a query language or software code.

It is another object of the present invention to provide such a method in which the user specifies the request via a graphical user interface.

It is a further object of the present invention to provide such a method that allows the user to revise the requested operation.

These and other objects of the present invention are achieved by a computer-implemented method for specifying an operation via a graphical interface, comprising the steps of examining an image to distinguish a first bordered region within the image, examining the image to distinguish a second bordered region within the image, and determining a functional attribute of the second bordered region based on a position of the second bordered region relative to the first bordered region.

DESCRIPTION OF THE INVENTION

In accordance with the present invention, a method is implemented by a set of algorithms that interpret user-manipulated graphic and textual elements. Through a graphical user interface, a user demarcates two or more bordered regions of an image. The image is examined to distinguish each bordered region, and a functional attribute is associated with each bordered region based on a position of a given bordered region relative to a position of another bordered region. Thereafter, a database command is generated based on a functional attribute associated with the given bordered region.

A data structure referred to as a schema specifies a manner in which certain information shall be treated or interpreted. A region schema defines the names and the relative locations of each bordered region. A parameter schema specifies a manner in which data from a particular bordered region shall be formatted into a database command. The parameter schema also specifies a manner in which data shall be formatted .for placement into a particular bordered region. Collectively, these schemas set forth a functional attribute of a bordered region on the basis of the relative position of the region within the image.

Figure 1:
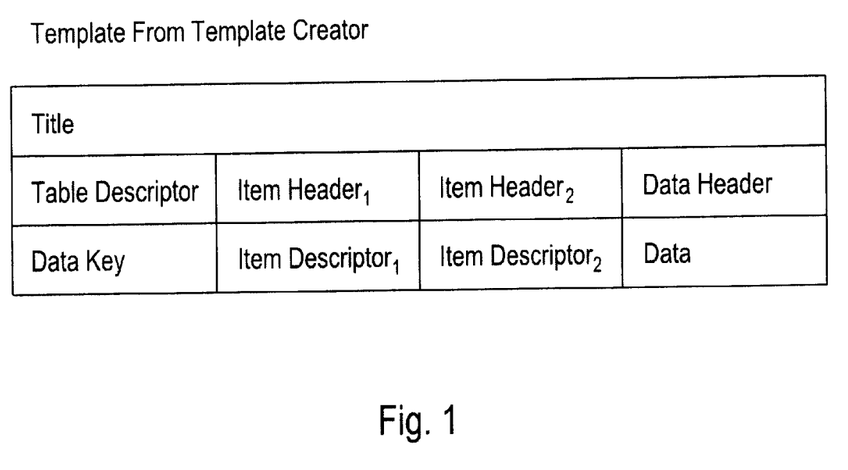
FIG. 1 is a diagram of a template from-which a table can be constructed in accordance with the present invention.

FIG. 1 is a diagram of a template, based on a region schema, from which a table can be constructed in accordance with the present invention. The functional attributes and spatial relationships of the bordered regions are specified in the region schema. This template and the corresponding region schema represent an exemplary implementation for use with the present invention.

A table prepared in accordance with the exemplary region schema includes nine bordered regions, each having a functional attribute, namely a Title, a Table Descriptor, an Item Header$_1$, an Item Header$_2$, a Data Header, a Data Key, an Item descriptor$_1$, an Item Descriptor$_2$, and Data. The attribute associated with each region is described below.

A functional attribute of a given region is based on that region's position relative to the position of another region. For example, the region at the top of the template is recognized as having the functional attribute of "Title", and a region having the functional attribute of "Item Descriptor$_1$" is below a bordered region having the functional attribute of "Item Header$_1$."

Title: The Title provides the name of the table. A table has one Title region.

Table Descriptor: The Table Descriptor specifies a number of columns of Data Keys, and a columnar offset to a first column of data. It can also specify other properties of the table or operations that can be performed on the table. For example, it can indicate features such as whether to (1) recognize a double click of a mouse button to launch a graph, (2) allow the user to insert rows or columns, and (3) allow an automatic expansion of the table upon an import of data. A table has one Table Descriptor region.

Data Key: The Data Key specifies one or more characteristics associated with a set of one or more contiguous Data regions that contain the same type of data. For example, the characteristics can include, a position or a columnar offset to the set of Data regions, a columnar width of the set, behavioral aspects (e.g., import (I), export (X), protected (P), or unprotected(U)) of data in the set, and a source of the data in the Data regions. The contiguous data regions specified by the Data Key are in a single row, however, a row can contain more than one type of data, and each type must have a corresponding Data Key.

Item Header$_1$: The Item Header$_1$ defines a category of one or more Item descriptor$_1$ regions in the table. Exemplary Item Headers$_1$ include "Line of Business", "Product Line", and "Sub-Product."

Item Header$_2$: The Item Header$_2$ defines a category of one or more Item Descriptor$_2$ regions in the table.

Data Header: The Data Header specifies a parameter or dimension of one or more Data regions in the table. For example, a Data Header can specify that an underlying Data region is part of a time series, i.e. "1995", "1996", "1997", etc. A table can include one or more Data Header regions, that is one Data Header region for each column of data.

Item descriptor$_1$: The Item Descriptor$_1$ describes a type of data item to be accessed in a database. For example, an Item Descriptor$_1$ can be a broad descriptor of a product such as "Gloves" or "Bats." A table can include one or more Item Descriptor$_1$ regions, and a single Item Descriptor$_1$ region can be associated with one or more contiguous rows of data.

Item Descriptor$_2$: The Item Descriptor$_2$, in conjunction with an Item descriptor$_1$, further describes a type of data item to be accessed in the database. Exemplary Item Descriptors$_2$ include, "Forecast Sales", "Actual Sales", "Units In Inventory." A table can include one Item Descriptor$_2$ region per row, but one or more Item Descriptor$_2$ regions may be associated with a single Item Descriptor$_1$ region.

Data: The Data is the datum or data that is sent to, or retrieved from a database. In some cases, data is entered into a Data region manually by the end-user. In other cases, it is entered automatically as a result of a database access. A Data region can be blank, such as in a case where data has not yet been retrieved from the database. A table can include one or more Data regions per row.

Figure 2:
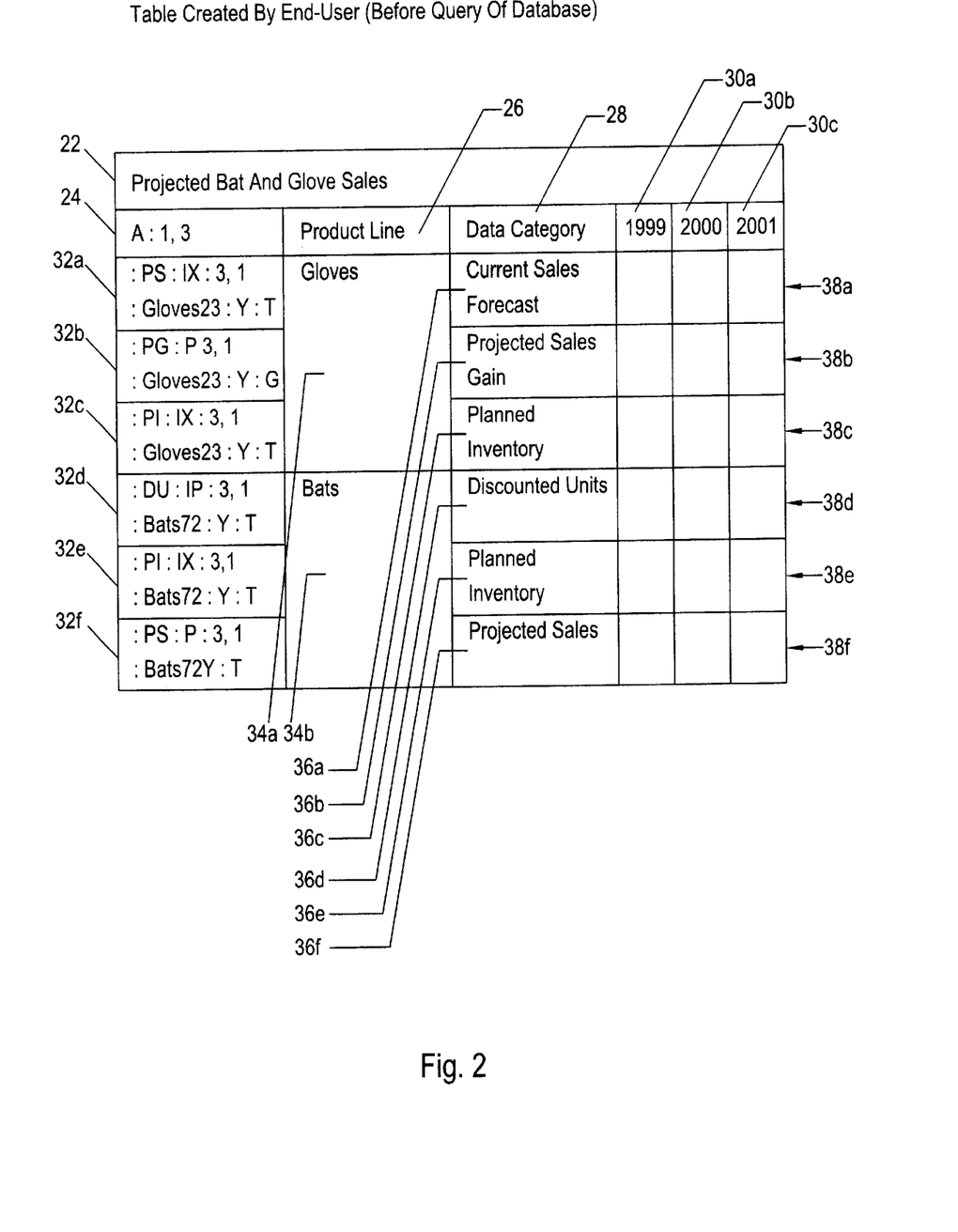
FIG. 2 is a diagram of a table based on the template in FIG. 1, and created by an end-user, as it would appear before sending a query to a database.

FIG. 2 is a diagram of a table based on the template shown in FIG. 1, and created by a user who wishes to access a database. The user defines bordered regions in an image by drawing lines with a graphical user interface. The graphical user interface can be any software application that enables the user to place lines and text into the image, including a conventional word processor, spreadsheet, or drawing package. For example, in a spreadsheet application a user can demarcate a bordered region by selecting one or more adjacent cells and highlighting a perimeter formed by the sides of the cells.

In the table shown in FIG. 2, the user is permitted to add columns and rows of Data, and corresponding Data Keys, Item Descriptors$_1$, Item Descriptors$_2$, Data Headers and Data regions, thus increasing the dimension of the table beyond that illustrated by the template shown in FIG. 1. The table shown in FIG. 2 has a Title region 22 indicating "Projected Bat and Glove Sales". An Item Header$_1$ region 26 defines a category of "Product Line" for underlying Item Descriptor$_1$ regions 34a and 34b. An Item Header$_2$ region 28 defines a category of "Data Category" for underlying Item Descriptor$_2$ regions 36a through 36f. Data Header regions 30a, 30b and 30c indicating "1999", "2000", and "2001", respectively, are associated with three columns of Data regions organized into six Data rows 38a through 38f.

Note that the user is permitted to associate an Item Descriptor$_1$ region with one or more contiguous rows of data by drawing the Item Descriptor$_1$ region adjacent to the rows with which it is associated. Accordingly, Item Descriptor$_1$ region 34a indicating "Gloves" is associated with rows 38a, 38b and 38c, which are further identified in Item Descriptor$_2$ region 36a as "Current Sales Forecast", Item Descriptor$_2$ region 36b as "Projected Sales Gain", and Item Descriptor$_2$ region 36c as "Planned Inventory". Likewise, Item Descriptor$_1$ region 34b indicating "Bats" is associated with rows 38d, 38e and 38f, which are further identified in Item Descriptor$_2$ region 36d as "Discounted Units", Item Descriptor$_2$ region 36e as "Planned Inventory" and Item Descriptor$_2$ region 36f as "Projected Sales".

A Table Descriptor region 24, as illustrated in FIG. 2, contains the text "A:1,3". The "A" is an arbitrary symbol, shown here as an example to indicate a property or operation that can be performed on the table as discussed above in the paragraph describing the Table Descriptor in the context of FIG. 1. The "1" indicates that the table contains 1 Data Key column, and the "3" indicates that the first column of Data rows 38a through 38f is an offset of 3 columns from the end of the Data Key region. Any desired property or operation can be represented in the Table Descriptor by any convenient symbol. The manner in which this information is represented is not critical to the invention.

The table includes six Data Key regions 32a through 32f, each corresponding to one of the six Data rows 38a through 38f. As stated above in the paragraph describing the Data Key in the context of FIG. 1, a Data Key specifies characteristics associated with a set of one or more contiguous Data regions. The content of a Data Key region can be entered manually, or it can be generated and entered automatically after examining the content of other regions in the table. By way of example, Data Key 32a contains a string of text, "PS:IX:3,1:Gloves23:Y:T". This text indicates that the data in Data row 38a is recognized by a database as Projected Sales (PS), the data can be Imported and Exported (IX), the corresponding Data region in row 38a starts at column "3" and is offset by"1" column from the end of Item Descriptor$_2$ region 36a, a database item key is "Gloves23", and the data is Yearly (Y) Total (T) sales. In FIG. 2, Data Key regions 32b through 32f contain strings of text similar to that of Data Key region 32a, all of which are presented here only for the purpose of example. In implementation, any desired characteristic can be represented by any convenient symbol.

Given an image that includes a table such as that shown in FIG. 2, the present invention operates by examining the image, distinguishing each bordered region described above, and determining a functional attribute for each of these regions. The invention proceeds by reading data from within the regions, and formatting the data into a database command based on the functional attributes. The invention then issues the database command to a database. Any database command can be created, including a query command, an update command, an insert command, and a delete command.

Figure 3:
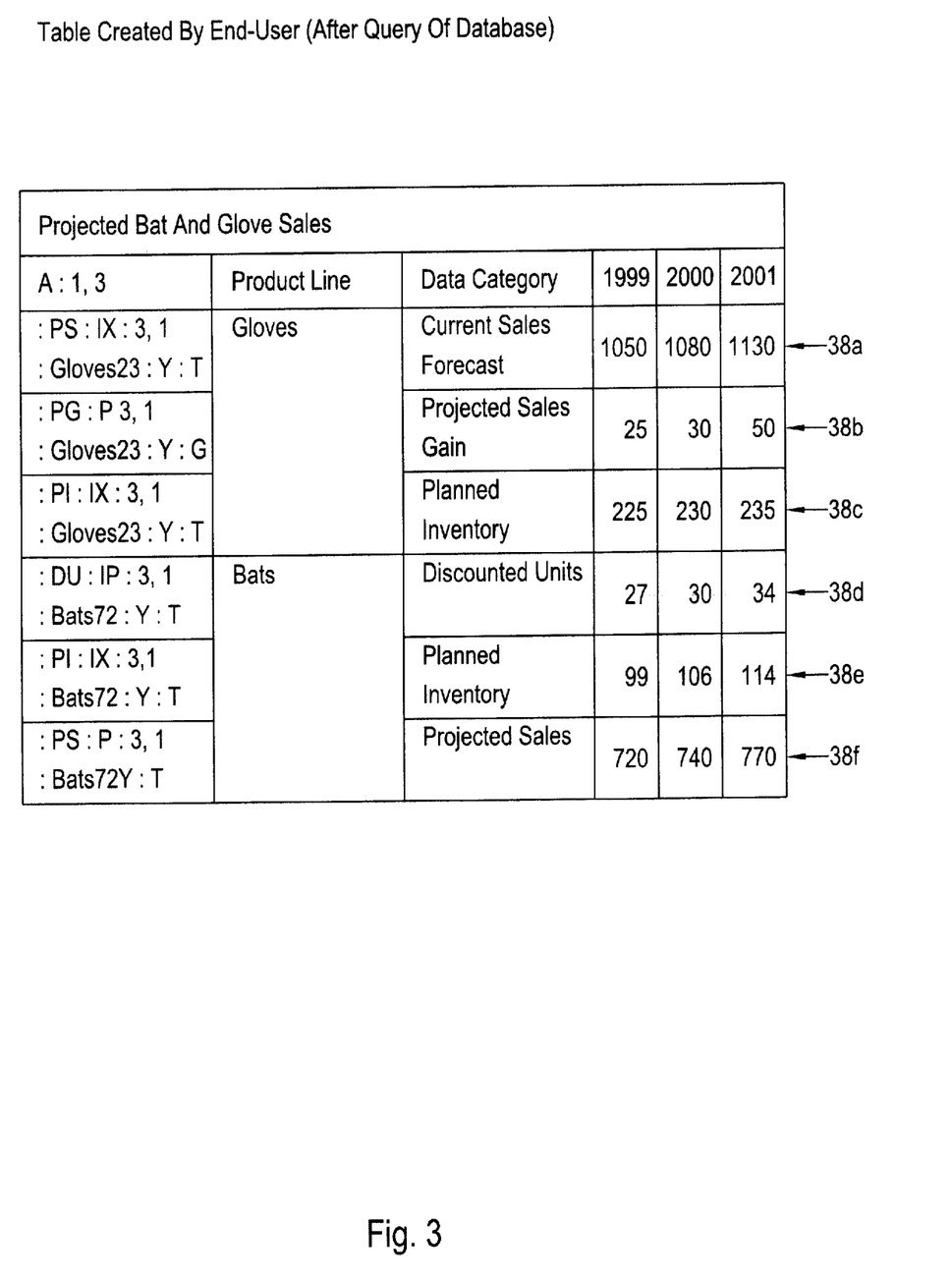
FIG. 3 is a diagram of the table in FIG. 2, as it would appear after receiving a result from a database.

FIG. 3 is a diagram of the table in FIG. 2, as it would appear after receiving a result of a query from a database. The invention has written the result into the Data regions in rows 38a through 38f.

Figure 4:
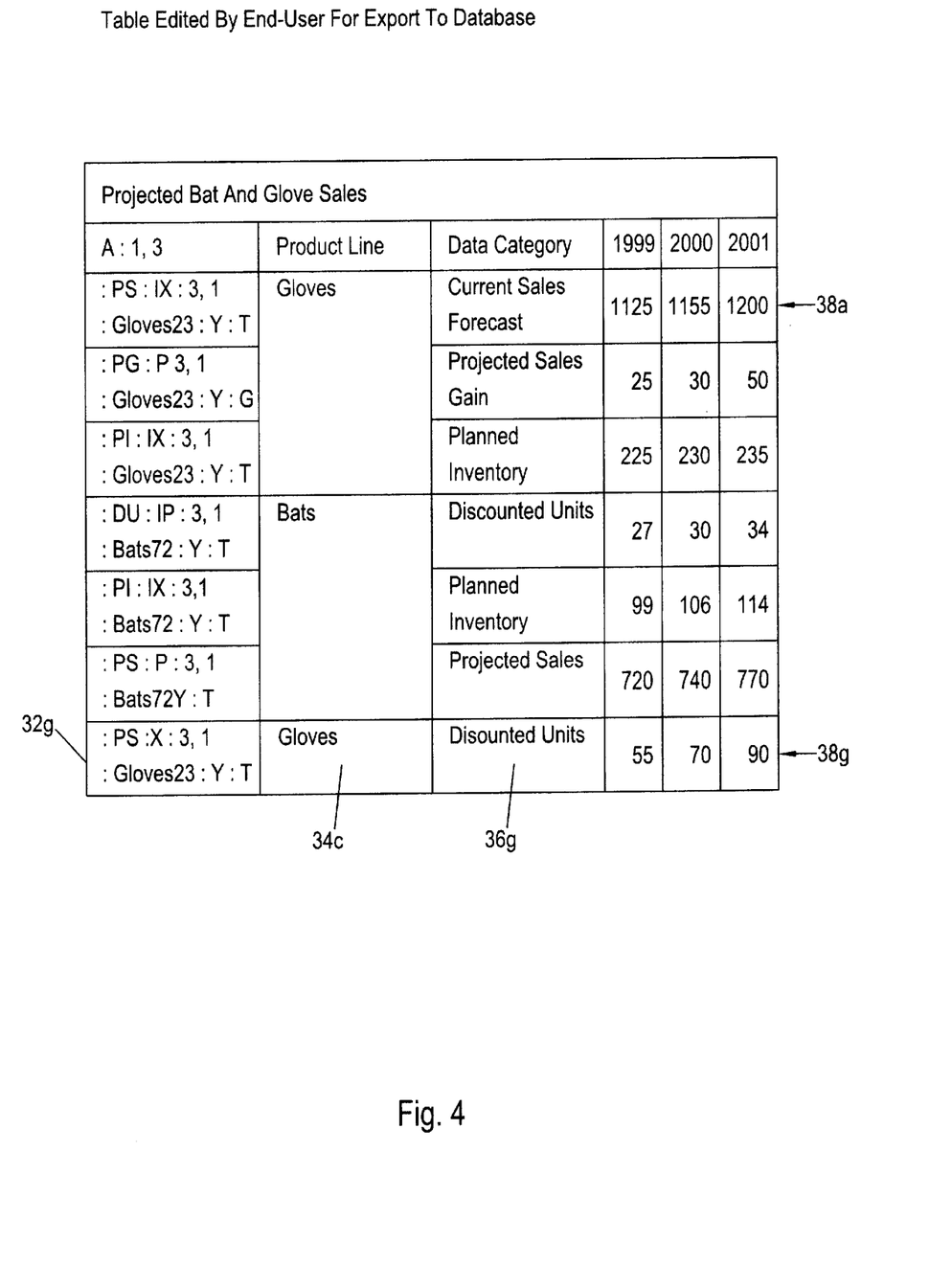
FIG. 4 is a diagram of the table in FIG. 3, further edited by an end-user.

FIG. 4 is a diagram of the table in FIG. 3, further edited by a user. In particular, the user has modified the image by changing the content of the Data regions in row 38a, and by adding a Data Key region 32g, an Item Descriptor$_1$ region 34c, an Item Descriptor$_2$ region 36g, and Data regions in a row 38g. Each of these added regions has a functional attribute derived from the region's position in the image.

In addition to changing the content of the Data regions in row 38a, the user also added content to each of the new regions in row 38g. Note that Item Descriptor$_2$ region 36g indicates "Discounted Units" and that the user has written data to the Data regions in row 38g. Data Key region 32g indicates that the data in row 38g is for Export (X) to a database. Accordingly, the present invention will apply the data from rows 38a and 38g to update the database. Thus, as shown in FIGS. 3 and 4, an import/export operation can include a query, a data retrieval, a data update, etc., for an individual cell of data as well as for multiple units of data.

Figure 5:
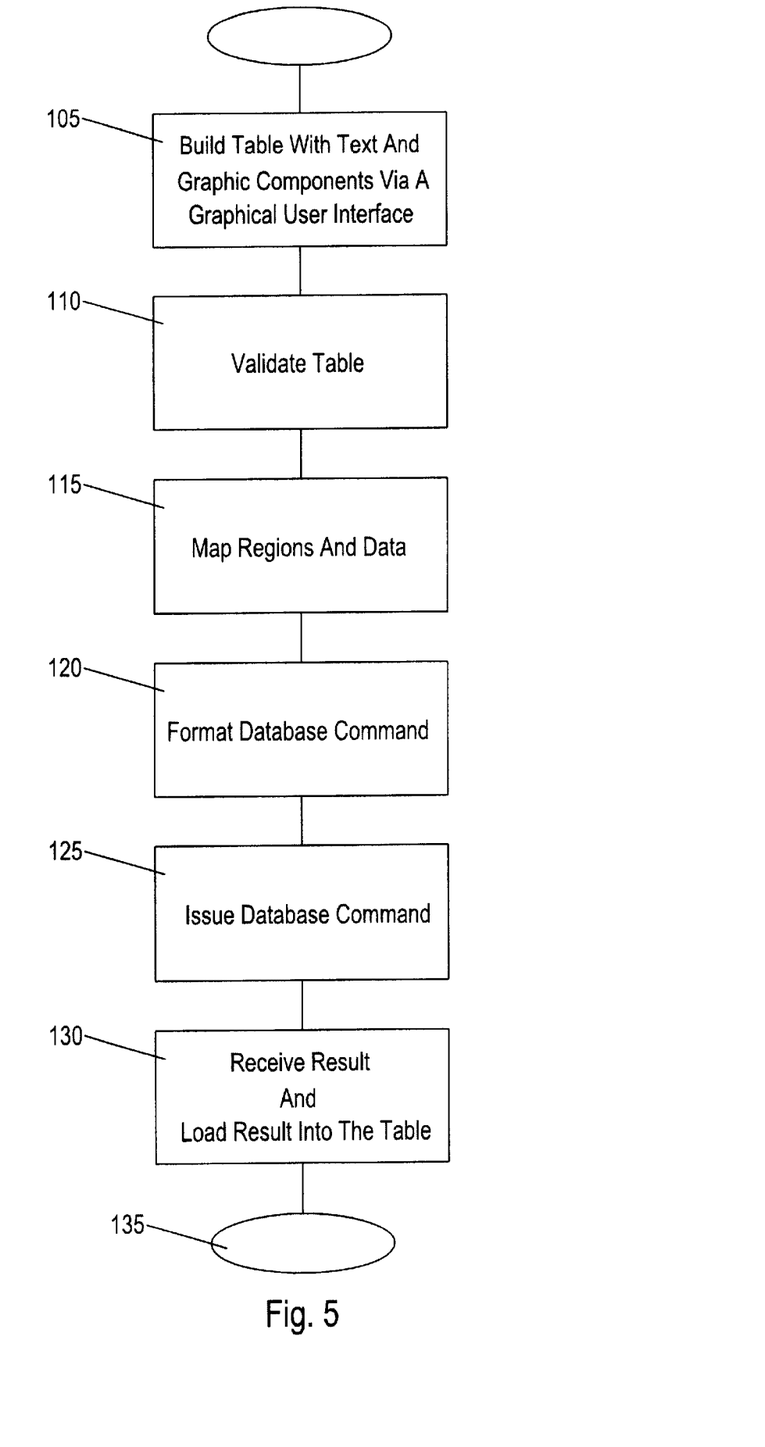
FIG. 5 is a flowchart of a method for specifying a database import/export operation through a graphical user interface in accordance with the present invention.

FIG. 5 is a flowchart of a method for specifying a database import/export operation through a graphical user interface in accordance with the present invention. The method begins with step 105.

In step 105, via a graphical user interface, a user creates an image, which includes two or more bordered regions. A functional attribute is associated with each bordered region based on its position in.the image relative to another bordered region. The bordered regions are arranged in accordance with a region schema, which defines the names and the relative locations of the bordered regions. Preferably, the bordered regions are organized into a table. An image can include more than one table. The method then advances to step 110.

In step 110, the method validates a table to determine whether the table conforms to the requirements set forth in the region schema. This step is described below in greater detail in association with FIG. 6. The method then advances to step 115.

In step 115, data from the bordered regions is mapped into a buffer for subsequent processing. This step is described below in greater detail in association with FIG. 7. The method then advances to step 120.

In step 120, the method reads data from the buffer indicated in step 115, and formats the data into a database command. This step is described below in greater detail in association with FIG. 8. The method then advances to step 125.

In step 125, the database command from step 120 is issued to a database. The method then advances to step 130.

In step 130, the method receives a result of the database command and loads the result into a region in the image. This step is described below in greater detail in association with FIG. 9. The method then advances to step 135.

In step 135, the method for specifying a database import/export operation through a graphical user interface ends.

Figure 6:
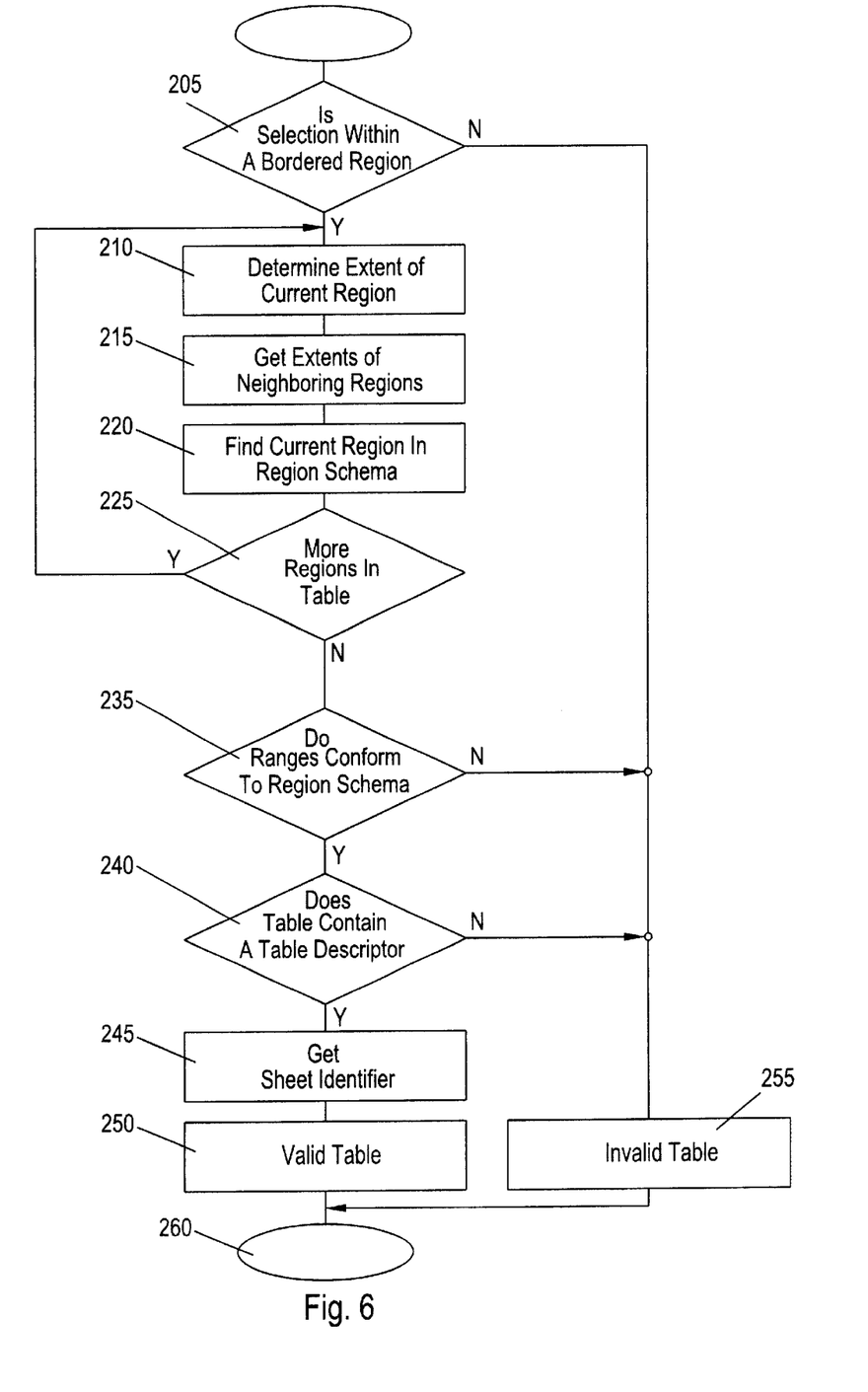
FIG. 6 is a flowchart of a method for validating a graphical table in accordance with the present invention.

FIG. 6 is a flowchart of a method for validating a graphical table in accordance with the present invention. Generally, this method determines whether an image includes a properly structured table. That is, it determines whether the image includes a correct quantity of properly located bordered regions. FIG. 6 is a detailed illustration of the operation of step 110 of FIG. 5. The method illustrated by FIG. 6 begins with step 205.

In step 205, the method examines the image to determine whether it includes a bordered region. If the image does not include a bordered region, then the method branches to step 255. If the image does include a bordered region, then the method advances to step 210.

In step 210, the method determines the spatial extent of a current region, i.e., the bordered region being examined. The method then advances to step 215.

In step 215, the method determines the spatial extent of regions adjacent to the current region. The method then advances to step 220.

In step 220, the method associates the current region with a region set forth in a region schema. The region schema defines names and relative locations of bordered regions within a table. The method then advances to step 225.

In step 225, the method determines whether the image contains an unexamined region. If the image does contain an unexamined region, then the method loops back to step 210. If the image does not contain an unexamined region, then the method advances to step 235.

In step 235, the method determines whether the relative positions of the bordered ranges, which were.obtained in steps 210 and 215, conform to the region schema. If the relative positions do not conform to the region schema, then the method branches to step 255. If the relative positions do conform to the region schema, then the method advances to step 240.

In step 240, the method determines whether the image includes a valid Table Descriptor region, which includes valid table descriptor data. If the image does not include a valid Table Descriptor region, then the method branches to step 255. If the image does include a valid Table Descriptor region, then the method advances to step 245.

In step 245, for the case where a file includes multiple sheets of images, the method gets a sheet identifier for the present image. The present invention can operate on an image that includes a plurality of tables. Furthermore, the tables can be represented on different sheets of a graphical interface. A sheet identifier, such a Tab in an Excel™, spreadsheet, distinguishes sheets from one another. Excel™ is available from Microsoft Corporation of Redmond, Wash. The method then advances to step 250.

In step 250, the method declares that the image includes a valid table. The method determines the row and column offsets of the various bordered regions. The method then advances to step 260.

In step 255, the method declares that the image does not include a valid table. The method then advances to step 260.

In step 260, the method for validating a graphical table ends.

Figure 7:
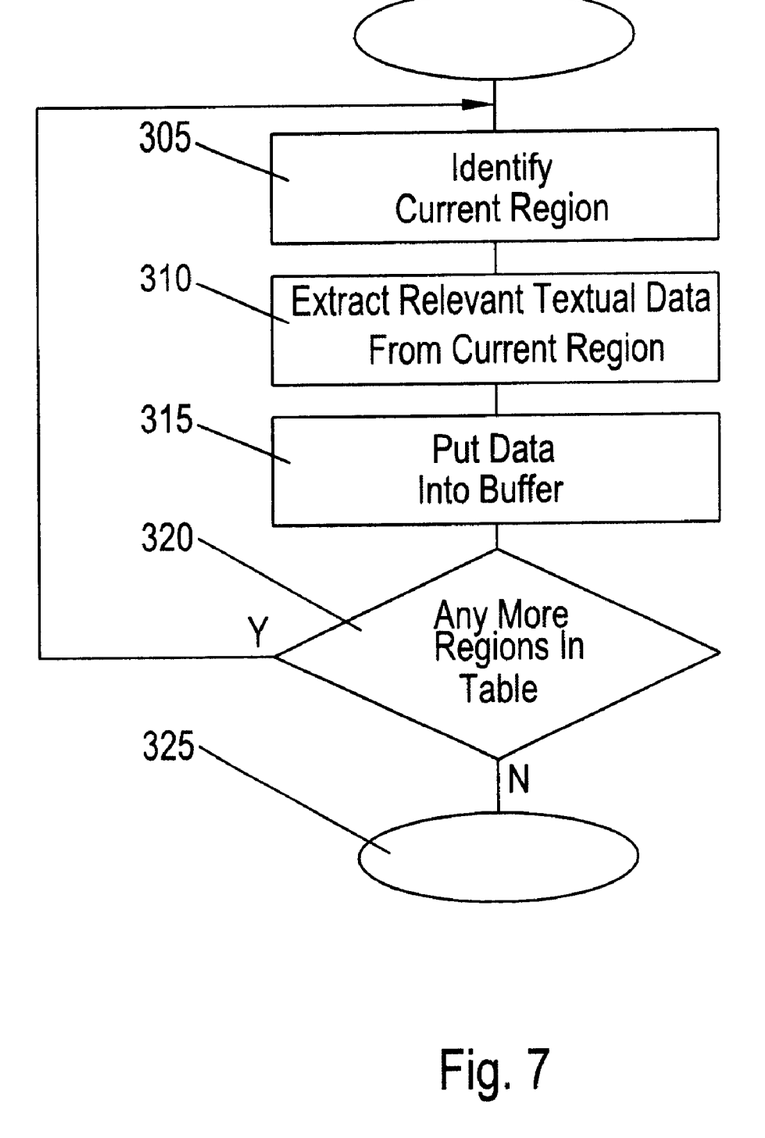
FIG. 7 is a flowchart of a method for mapping data from a table into a buffer in accordance with the present invention.

FIG. 7 is a flowchart of a method for mapping data from a table into a buffer in accordance with the present invention. Generally, this method examines a validated table, determines which aspects of the table are relevant to the desired purpose, i.e., formatting a database command, extracts data elements and puts data into a buffer. FIG. 7 is a detailed illustration of the operation of FIG. 5, step 115. The method illustrated by FIG. 7 begins with step 305.

In step 305, the method examines the image to identify a current region, i.e., the bordered region being examined.

Having identified the region, the method can ascertain a functional attribute associated with the region, and recognize the relevance of data contained within the region. The method then advances to step 310.

In step 310, the method extracts relevant data from the current region. The method then advances to step 315.

In step 315, the method puts the extracted data into a buffer. The method then advances to step 320.

In step 320, the method determines whether the table contains an unexamined region. If the table does contain an unexamined region, then the method loops back to step 305. If the table does not contain an unexamined region, then the method advances to step 325.

In step 325, the method for mapping data from a table into a buffer ends.

Figure 8:
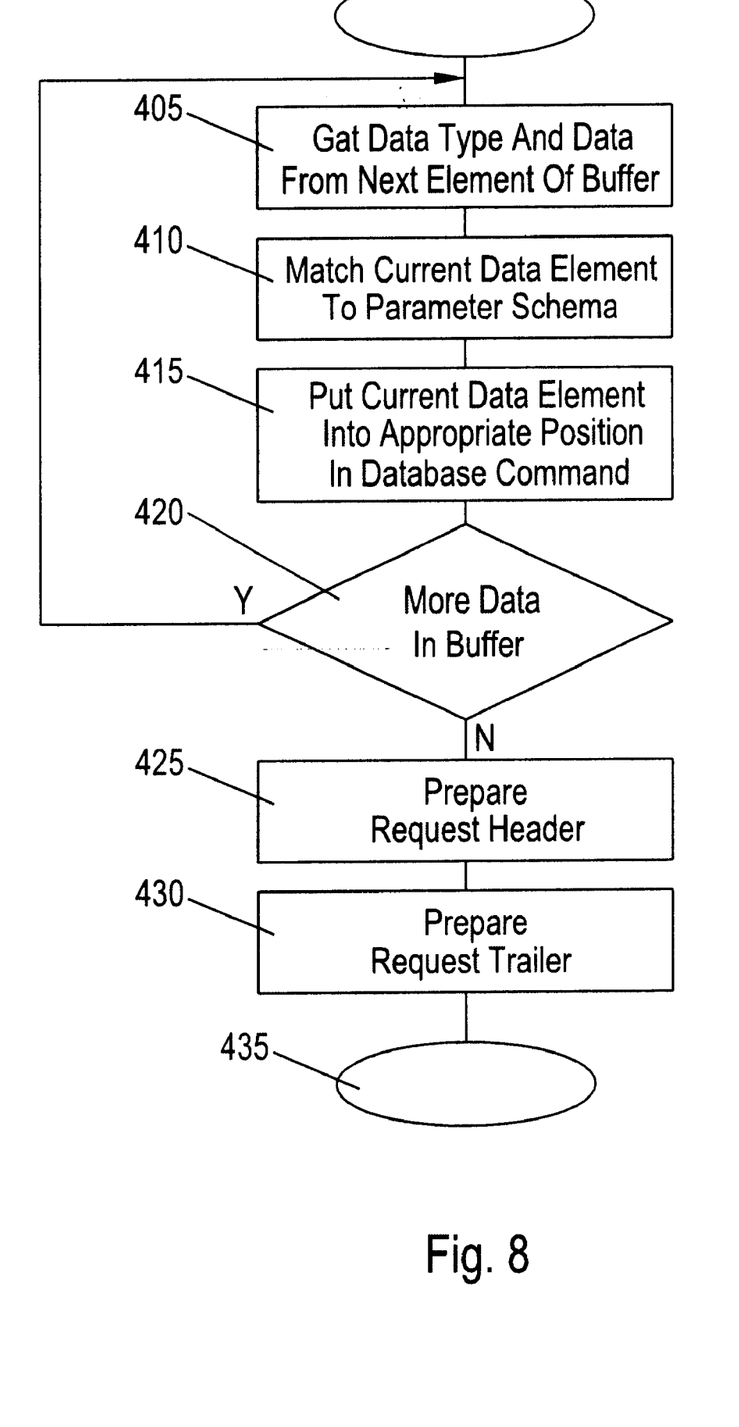
FIG. 8 is a flowchart of a method for formatting a database command in accordance with the present invention.

FIG. 8 is a detailed illustration of the operation of step 120 of FIG. 5. FIG. 8 is a flowchart of a method for formatting a database command in accordance with the present invention. Because each bordered region has an associated functional attribute, the method effectively formats the data into a database command based on the functional attribute of the region from which the data was extracted. The method begins with step 405.

In step 405, the method gets a data element from the buffer indicated in FIG. 5 at step 115. The method then advances to step 410.

In step 410, the method associates the current data element with a parameter schema, which specifies a manner in which data from a particular bordered region shall be formatted into a database command. The method then advances to step 415.

In step 415, the method puts the current data element into an appropriate position of a database command based on the parameter schema indicated in step 410. The method then advances to step 420.

In step 420, the method determines whether the buffer contains more data. If the buffer contains more data then the method loops back to step 405. If the buffer does not contain more data, then the method advances to step 425.

In step 425, the method prepares a header for the database command. The header can include, for example, a user name, a date, a work station identification, a file name, and a document sheet identification. The method then advances to step 430.

In step 430, the method prepares a trailer for the database command. The trailer can include, for example, an end-of-file marker. The method then advances to step 435.

In step 435, the method for formatting a database command ends.

Figure 9:
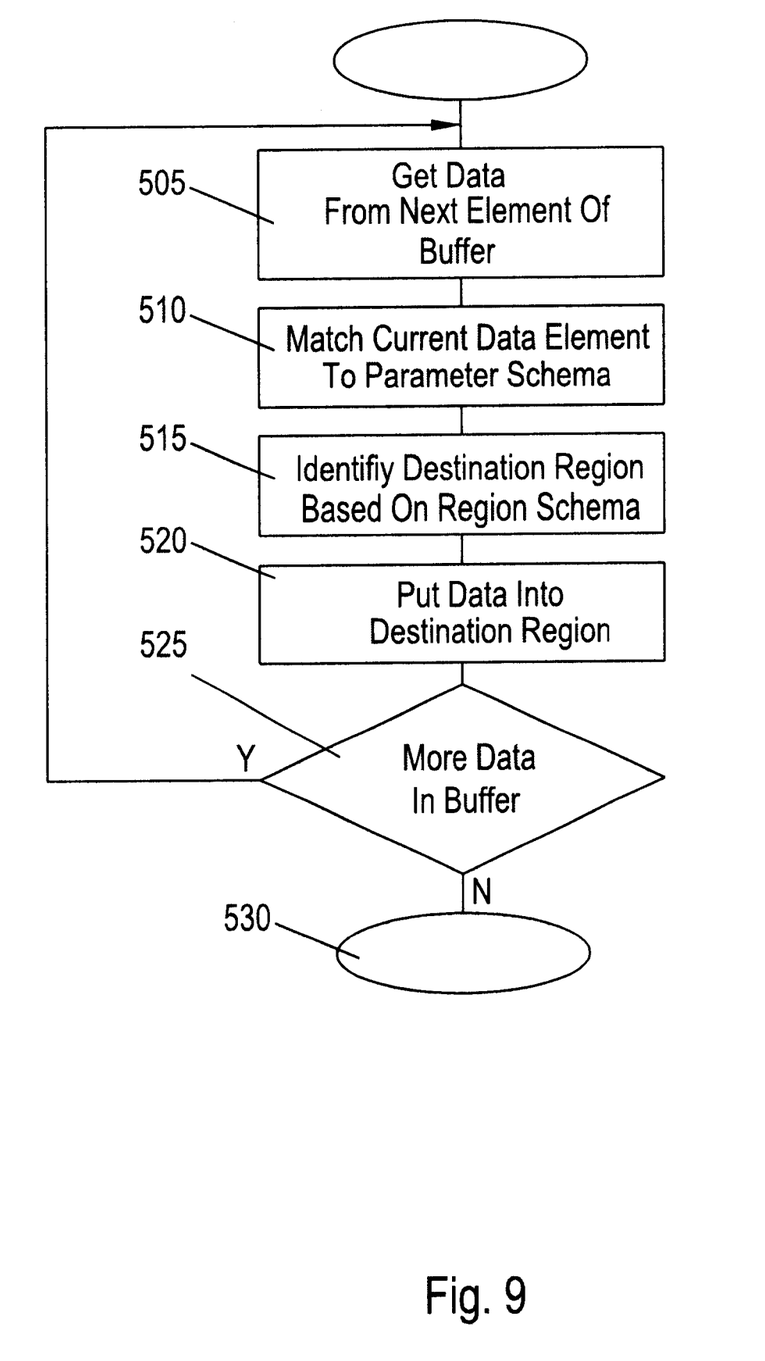
FIG. 9 is a flowchart of a method for transferring data from a buffer.into a graphical table in accordance with the resent invention.

FIG. 9 is a detailed illustration of the operation of step 130 of FIG. 5. FIG. 9 is a flowchart of a method for transferring data from a buffer into a graphical table in accordance with the present invention. The method begins with step 505.

In step 505, the method gets a data element from a buffer that holds a result of a database command. The method then advances to step 510.

In step 510, the method associates the current data element with a parameter schema, which specifies a manner in which data shall be formatted for placement into a particular bordered region. The method then advances to step 515.

In step 515, the method identifies the destination region for the data based on a region schema. The method then advances to step 520.

In step 520, the method puts the data into the region indicated in step 515. The method then advances to step 525.

In step 525, the method determines whether the buffer contains more data. If the buffer contains more data, then the method loops back to step 505. If the buffer does not contain more data, then the method advances to step 530.

In step 530, the method for transferring data from a buffer into a graphical table ends.

Figure 10:
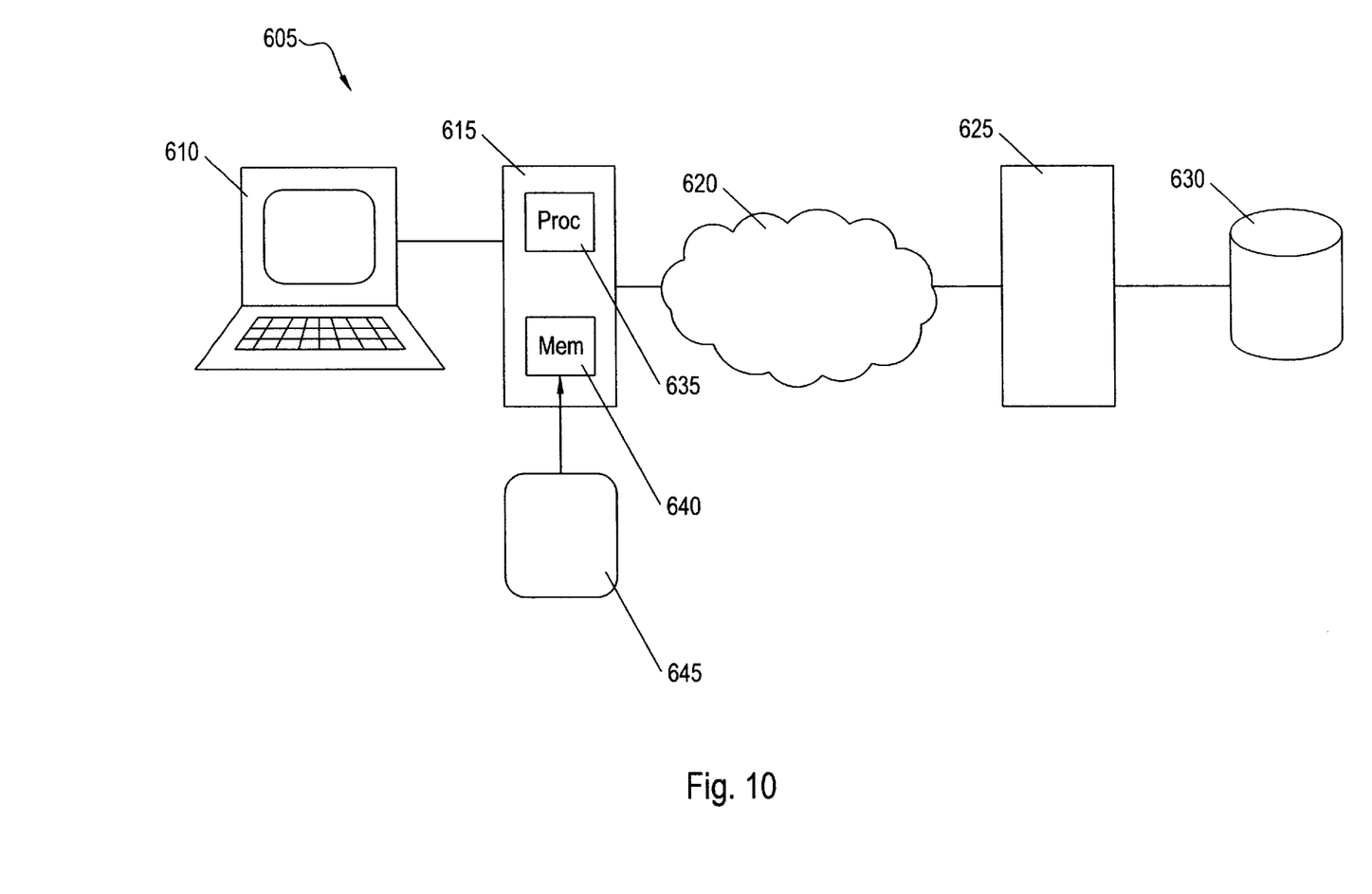
FIG. 10 is a block diagram of a computer system particularly suited for employment of the present invention.

FIG. 10 is a block diagram of a computer system 605 particularly suited for employment of the present invention. Computer system 605 includes a user interface 610, a local computer 615, a network 620, a database server 625 and a database 630. Local computer 615 includes a memory 640 for the storage of data and instructions, and an associated processor 635 for the execution of instructions.

Processor 635 executes instructions from memory 640 to perform the method steps described above. While the procedures required to execute the invention hereof are indicated as already loaded into processor memory 640, they may be configured on a storage media, such as data memory 645, for subsequent loading into processor memory 640.

User interface 610 is coupled to local computer 615. Local computer 615 is connected to server 625 across network 620. Server 625 is coupled to database 630.

A user of user interface 610 demarcates two or more bordered regions in an image using a graphical interface such as a word processor, spreadsheet or drawing application. Local computer 615 examines the image to distinguish a first bordered region and a second bordered region within the image. Local computer 615 then determines a functional attribute of the second bordered region based on a position of the second bordered region relative to the first bordered region. In an image containing more than two bordered regions, local computer 615 further examines the image to distinguish and determine a functional attribute of each bordered region.

Thereafter, local computer 615 reads data from within the second bordered region, formats the data into a database command based on the functional attribute and issues the database command to server 625. In turn, server 625 obtains a result of the database command from database 630 and sends the result to local computer 615. Local computer 615 writes the result into a bordered region of the image.

It should be understood that various alternatives and modifications can be devised by those skilled in the art The present invention is intended to embrace all such alternatives, modifications and variances that fall within the scope of the appended claims.

What is claimed is:

1. A method, executed by a processor, for specifying an operation via a graphical interface, comprising the steps of:
   examining an image to distinguish a first bordered region within said image by detecting a line that demarcates a perimeter of said first bordered region;
   examining said image to distinguish a second bordered region within said image by detecting a line that demarcates a perimeter of said second bordered region;
   determining a functional relationship between said second bordered region and said first bordered region based on a position of said second bordered region relative to said first bordered region;
   reading data from within said second bordered region;
   formatting said data into a database command based on said functional relationship; and
   issuing said database command to a database.

2. The method of claim 1, wherein said database command is selected from the group consisting of a query command, an update command, an insert command, and a delete command.

3. The method of claim 1, further comprising, after said step of determining said functional relationship, the step of writing a result of a database query into said second bordered region.

4. The method of claim 1, wherein said first bordered region includes data that identifies said position of said second bordered region.

5. The method of claim 1, wherein said image comprises a line that includes a side of a cell in a spreadsheet.

6. A system for specifying an operation via a graphical interfaces, comprising:

means for examining an image to distinguish a first bordered region within said image by detecting a line that demarcates a perimeter of said first bordered region;

means for examining said image to distinguish a second bordered region within said image by detecting a line that demarcates a perimeter of said second bordered region;

means for determining a functional relationship between said second bordered region and said first bordered region based on a position of said second bordered region relative to said first bordered region;

means for reading data from within said second bordered region;

means for formatting said data into a database command based on said functional relationship; and means for issuing said database command to a database.

7. The system of claim 6, wherein said database command is selected from the group consisting of a query command, an update command, an insert command, and a delete command.

8. The system of claim 6, further comprising means for writing a result of a database query into said second bordered region.

9. The system of claim 6, wherein said first bordered region includes data that identifies said position of said second bordered region.

10. The system of claim 6, wherein said image comprises a line that includes a side of a cell in a spreadsheet.

11. A storage media that includes instructions for controlling a processor that specifies an operation via a graphical interface, said storage media comprising:

means for controlling said processor to examine an image to distinguish a first bordered region within said image by detecting a line that demarcates a perimeter of said first bordered region.

means for controlling said processor to examine said image to distinguish a second bordered region within said image by detecting a line that demarcates a perimeter of said second bordered region;

means for controlling said processor to determine a functional relationship between said second bordered region and said first bordered region based on a position of said second bordered region relative to said first bordered region;

means for controlling said processor to read data from within said second bordered region;

means for controlling said processor to format said data into a database command based on said functional relationship; and means for controlling said processor to issue said command to a database.

12. The storage media of claim 11, wherein said database command is selected from the group consisting of a query command, an update command, an insert command, and a delete command.

13. The storage media of claim 11, further comprising means for controlling said processor to write a result of a database query into said second bordered region.

14. The storage media of claim 11, wherein said first bordered region includes data that identifies said position of said second bordered region.

15. The storage media of claim 11, wherein said image comprises a line that includes a side of a cell in a spreadsheet.

16. A system for specifying an operation via a graphical interface, comprising:

a processor that examines an image to distinguish a first bordered region within said image by detecting a line that demarcates a perimeter of said first bordered region, examines said image to distinguish a second bordered region within said image by detecting a line that demarcates a perimeter of said second bordered region, and determines a functional relationship between said second bordered region and said first bordered region based on a position of said second bordered region relative to said first bordered region, wherein said processor reads data from within said second bordered region, formats said data into a database command based on said functional relationship, and issues said database command to a database.

17. The method of claim 1, wherein said functional relationship defines an association between data in said second bordered region and data in said first bordered region, wherein said position of said second bordered region relative to said first bordered region is that of being at an offset from a side of said first bordered region, wherein said second bordered region is a member of a plurality of second bordered regions that are at said offset from said side of said first bordered region, and wherein said association is defined between data in all of said plurality of second bordered regions and data in said first bordered region.

18. The system of claim 6, wherein said functional relationship defines an association between data in said second bordered region and data in said first bordered region, wherein said position of said second bordered region relative to said first bordered region is that of being at an offset from a side of said first bordered region, wherein said second bordered region is a member of a plurality of second bordered regions that are at said offset from said side of said first bordered region, and wherein said association is defined between data in all of said plurality of second bordered regions and data in said first bordered region.

19. The storage media of claim 11, wherein said functional relationship defines an association between data in said second bordered region and data in said first bordered region, wherein said position of said second bordered region relative to said first bordered region is that of being at an offset from a side of said first bordered region, wherein said second bordered region is a member of a plurality of second bordered regions that are at said offset from said side of said first bordered region, and wherein said association is defined between data in all of said plurality of second bordered regions and data in said first bordered region.

20. The system of claim 16, wherein said functional relationship defines an association between data in said second bordered region and data in said first bordered region, wherein said position of said second bordered region relative to said first bordered region is that of being at an offset from a side of said first bordered region, wherein said second bordered region is a member of a plurality of second bordered regions that are at said offset from said side of said first bordered region, and wherein said association is defined between data in all of said plurality of second bordered regions and data in said first bordered region.

\* \* \* \* \*